UNITED STATES PATENT OFFICE.

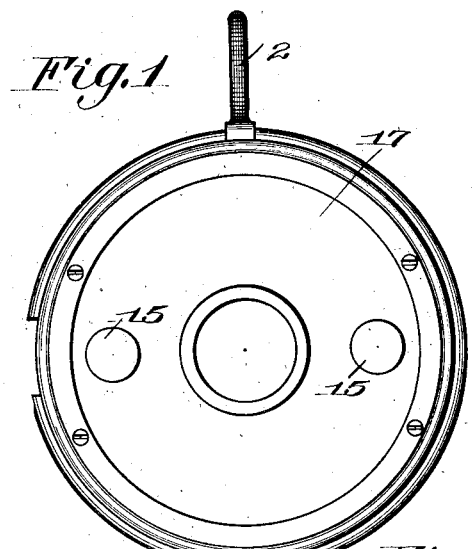
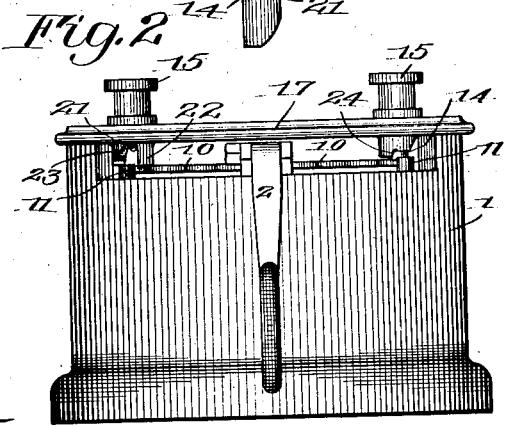
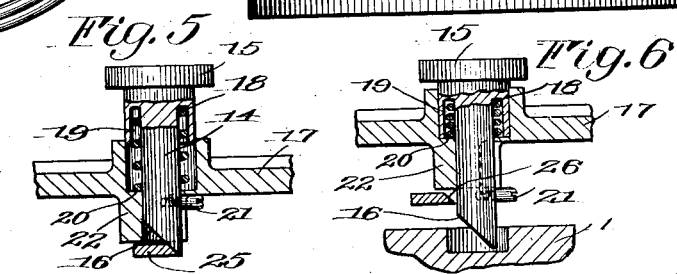
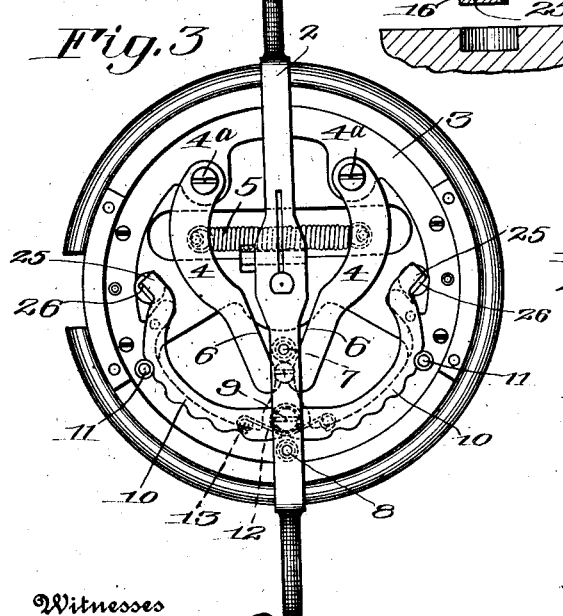
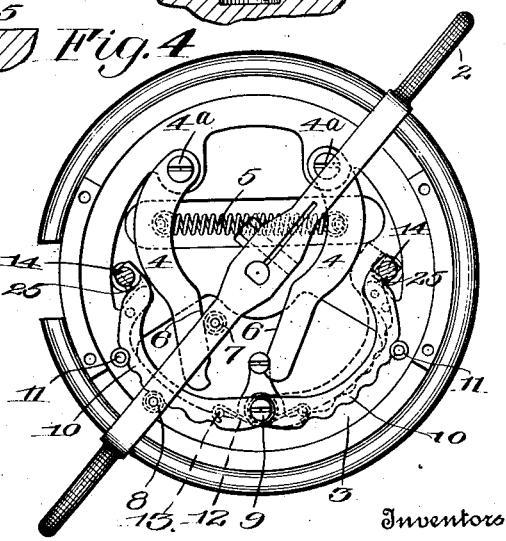

OSCAR H. PIEPER AND ALPHONSE F. PIEPER, OF ROCHESTER, NEW YORK.

ELECTRICAL CONTROLLING APPARATUS.

1,111,178. Specification of Letters Patent. Patented Sept. 22, 1914.

Application filed November 4, 1912. Serial No. 729,370.

*To all whom it may concern:*

Be it known that we, OSCAR H. PIEPER and ALPHONSE F. PIEPER, of Rochester, in the county of Monroe and State of New York, have invented certain new and useful Improvements in Electrical Controlling Apparatus; and we do hereby declare the following to be a full, clear, and exact description of the same, reference being had to the accompanying drawings, forming a part of this specification, and to the reference-numerals marked thereon.

The present invention relates to improvements in electrical controlling apparatus, and more particularly to that class of controllers illustrated in Patent No. 675,294, May 28, 1901, for regulating the motors of dental engines, and it has for its object to provide an improved apparatus for more readily controlling the stopping, starting, and different speeds of a motor and for adapting the apparatus so that the controlling lever will be automatically returned to its normal position when released, or will be automatically held in any adjusted position, according to the needs of the operator.

To these and other ends the invention consists in certain improvements and combinations of parts all as will be hereinafter more fully described, the novel features being pointed out in the claims at the end of the specification.

In the drawings: Figure 1 is a plan view of a controlling apparatus equipped with a preferred embodiment of the invention; Fig. 2 is a side elevation of the same; Fig. 3 is a plan view with the cover plate removed; Fig. 4 is a similar view, showing the controlling lever in one of its adjusted positions; Fig. 5 is a sectional view taken vertically through one of the locking devices, and showing the latter in raised position; Fig. 6 is a similar view showing the locking device lowered, and Fig. 7 is a detail view showing the locking device held in its lowermost position.

Similar reference numerals throughout the several figures indicate the same parts.

In the present embodiment of the invention, 1 designates the casing, and 2 the controlling lever which is pivoted centrally of the casing to turn on a vertical axis and suitably connected with the contacts of the controlling apparatus in a manner which is well known in the art.

3 is a supporting plate upon which the spring controlled arms 4 are pivotally mounted at 4ª, the arms being connected by a spring 5 and provided with oppositely disposed inclined surfaces 6 which engage a projection 7 mounted upon the controlling lever 2 whereby the lever is held in its normal position as in Fig. 3. The lever 2 also carries a second projection 8 which is arranged to engage a second pair of spring controlled arms, for the purpose of holding the lever in any one of its adjusted positions, as will now be described. To this end, a post 9 is secured in the supporting plate 3 and has pivotally mounted thereon the arms 10 which may be curved as shown, and preferably formed with corrugations or depressions which receive the projection 8 as the lever is turned. Abutments 11 are arranged upon the supporting plate in the path of the arms 10 to limit the outward movement of the latter, said arms being controlled by the spring 12 which is mounted upon the post 8 and engages projections 13 secured to the respective arms.

In some instances, it is desirable to render the arms 10 inoperative with respect to the controlling lever, so that the latter will be returned to its normal position as soon as released, and to this end, we provide locking devices arranged to engage the curved arms and to move them out of coöperative relation with the controlling lever, said arms being held in such inoperative position until the locking devices are released. This may be accomplished in different ways, and in the present embodiment there is shown a preferred arrangement consisting of locking devices preferably embodying the pins 14 having heads 15 and beveled ends 16, said pins being arranged for vertical movement in the cover plate 17 and held normally in raised position by means of springs 18 which are housed in the recesses 19 of the pins and engage coöperating shoulders 20 on the cover plate.

The pins 14 carry the projections 21 which limit their upward movement and also serve to lock the pins in their lowermost position in the following manner: 22 are collars formed on the lower side of the cover plate to receive the locking pins, said collars being cut away to form cam surfaces 23 which terminate in recesses 24 at the base thereof. By depressing the locking pins and rotating them simultaneously, the projections 21 may be brought into engagement with the recesses 24, and the pins are thereby held in their lowermost position to lock the curved arms out of engagement with the controlling lever. The free ends of the curved arms, designated at 25, have beveled edges 26 which are adapted to be engaged by the beveled ends 16 of the locking members, as shown in Figs. 5 and 6, and when the locking members are depressed, the arms are moved to the position shown in dotted lines in Fig. 4. By this construction, either one or both of the curved arms may be locked in inoperative position, leaving the controlling lever free to be returned to its normal position under the action of the arms 4, and when the curved arms are operating, the controlling lever may be held automatically in any position of adjustment, to obtain different speeds of the motor, while at the same time requiring only a slight pressure of the foot to release the same.

It is to be understood that the invention is not limited to the particular construction and arrangement set forth, and we intend to cover by this application any modification that may come within the purpose of the invention and the scope of the claims hereinafter.

We claim as our invention:

1. In a controlling apparatus, the combination with a lever, of pivoted spring-operated arms coöperating with said lever, said arms having the edges of their free ends beveled, and vertically movable pins provided with beveled portions adapted to engage said edges on the arms to move the latter out of coöperative relation with the lever.

2. In a controlling apparatus, the combination with a pivoted lever, of pivoted spring-operated arms having opposing converging surfaces coöperating with the lever, additional pivoted spring-operated arms having corrugated surfaces coöperating with the lever, the last mentioned arms having free ends provided with beveled edges, and locking pins vertically movable relatively to said arms and having beveled portions coöperating with said beveled edges to move the arms out of engagement with said lever.

3. In a controlling apparatus, the combination with a pivoted lever, of pivoted spring-operated arms having opposing converging surfaces coöperating with the lever, additional pivoted spring-operated arms having corrugated surfaces coöperating with the lever, and movable locking devices coöperating with the free ends of the last mentioned arms to move them out of engagement with said lever.

4. In a controlling apparatus, the combination with a pivoted lever having independent projections thereon, of spring-operated arms pivoted on separate axes and having opposing converging surfaces coöperating with one of said projections, additional spring-operated arms having corrugated surfaces, the last mentioned arms being pivoted on the same axis and coöperating with the other of said projections on the lever, and vertically movable locking devices coöperating with the free ends of the last mentioned arms to move them out of engagement with the lever.

5. In a controlling apparatus, the combination with a pivoted lever, of pivoted spring-operated arms having opposing converging surfaces coöperating with the lever, additional pivoted spring-operated arms coöperating with the lever and vertically movable locking devices coöperating with the free ends of the last mentioned arms to move them out of engagement with said lever.

OSCAR H. PIEPER.
ALPHONSE F. PIEPER.

Witnesses:
R. L. Fitch,
R. W. Stewart.